DUMMY LOAD FOR MAGNETIC CORE LOGIC CIRCUITS
Filed March 8, 1962
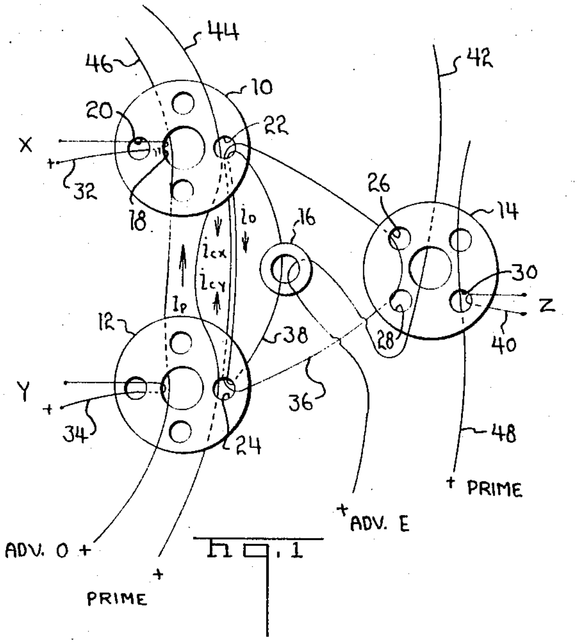
FIG. 1
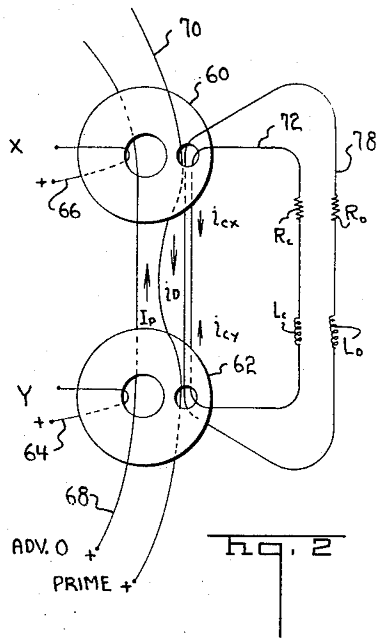
FIG. 2
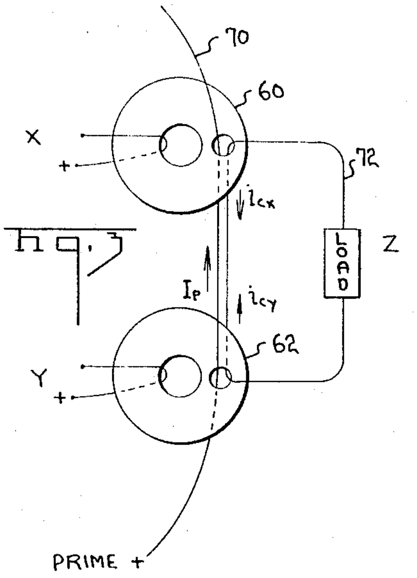
FIG. 3
FIG. 4
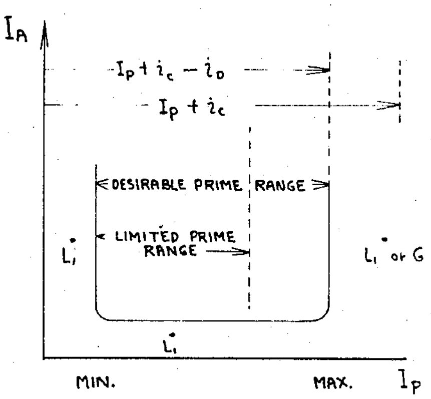
FIG. 5 FIG. 5A FIG. 5B
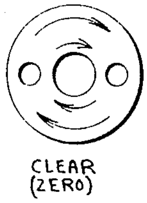
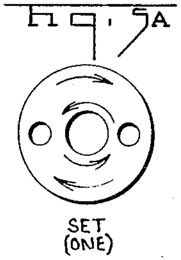
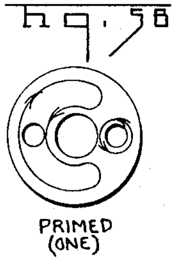

United States Patent Office 3,303,480

Patented Feb. 7, 1967

3,303,480

DUMMY LOAD FOR MAGNETIC CORE LOGIC CIRCUITS

David R. Bennion and William K. English, Menlo Park, and David Nitzan, Palo Alto, Calif., assignors to AMP Incorporated, Harrisburg, Pa.

Filed Mar. 8, 1962, Ser. No. 178,372

6 Claims. (Cl. 340—174)

This invention relates to an improvement in magnetic devices of the type utilized to perform operations in logic.

A primary object of the invention is to provide a means for improving the range of reliable operation of magnetic devices.

A further object of the invention is to provide an auxiliary circuit operable to prevent undesirable loss or gain of intelligence transferred by magnetic devices.

Another object of the invention is to provide an auxiliary circuit operable to extend the capability of "prime" limited logic devices.

The publication, "Mad-Resistance Type Magnetic Shift Registers," by Dr. D. R. Bennion, Proceedings of 1960 Non-Linear Magnetics and Magnetic Amplifiers Conference—AIEE, Philadelphia, October 26–28, 1960, pages 96–112, describes a MAD—R (Multi-aperture Device—Resistance) shift register employing the technique termed "priming." This technique has been adapted to numerous other logic units employing MAD—R circuits including two cores having their output apertures linked by the same coupling or transfer loop. In certain instances, as demanded by the particular logic function involved, it is necessary to have the common coupling loop wound through the core output apertures in a reverse sense. This requirement creates a situation wherein the M.M.F. resulting from "priming" a "set" core induces a coupling loop current which reenforces the prime current M.M.F. in the adjacent core threaded by the coupling loop thereby causing undesirable effects including the loss of intelligence, the gain of false intelligence, or alternatively, a reduction of the range of allowable prime current. This limitation makes many otherwise highly useful MAD—R logic devices commercially unacceptable.

The present invention contemplates an auxiliary or dummy loop wound about core output legs in a sense to generate an M.M.F. opposing the M.M.F. of prime induced currents in core circuits having a common coupling loop wound in reverse sense on the output portions of two cores. The effect of the present invention is that it makes a number of useful logic devices compatible in range of operation with the general specifications of magnetic core devices.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

General reference may be had to the above mentioned publication by Dr. Bennion for further explanation of the concept of MAD—R circuits and of the terminology used in the following description. It will be apparent to those skilled in the art that the invention, while exemplified relative to core devices, is adaptable to magnetic members in other forms having similar hysteresis characteristics.

In the drawings:

FIGURE 1 is a schematic diagram of a logic module incorporating the circuit of the invention.

FIGURE 2 is a diagram of the circuit of the invention in a simplified form.

FIGURE 3 is a diagram of the circuit giving rise to the problem solved by the invention.

FIGURE 4 is a diagram of certain operational characteristics of magnetic core devices.

FIGURES 5–5B represent the core magnetization states responsive to various core inputs.

Referring to FIGURE 4, there is depicted a "range map" of the type used to establish the operational limitations of MAD—R circuits. Briefly stated, the area defined by the curve indicates the values of advance and prime currents wherein satisfactory operation obtains. Outside the limits of the curve, a MAD—R circuit performs improperly by gaining or losing intelligence as indicated by the L1 and G1 points shown. An insufficient advance current ($I_A$) will result in a loss of "ones" by failing to switch a proper quantity of flux at a rate sufficient to properly set a receiving core. An insufficient prime current ($I_p$) will result in a loss of "ones" by under-priming the output portion of a core resulting in an insufficient flux for proper transmission to a receiving core. An excess $I_p$ may result in either a loss of "ones," or alternatively, a build up of "zeros" to cause a gain of "ones" dependent upon the type of prime windings utilized, and/or the particular logical circuit formed by the coupling loops.

The loss or gain of "ones" being unacceptable in most MAD—R applications demands that the applied $I_p$ be limited to values within the boundaries of the curve of FIGURE 4.

Referring now to FIGURE 3, there is shown the particular coupling loop arrangement which gives rise to the problem solved by the invention. Considering that certain logic functions demand core interconnections providing a "zero" output Z resulting from the cancellation of inputs X and Y, the output coupling loop must be reversely wound with respect to the cores. In FIGURE 3, it will be noted that loop 72 passes down about the output leg of core 60 and up about the output leg of core 62. The load 72 may be considered as the lump resistance and reactance of the winding 72. As a matter of convenience, the flux dispositions shown in FIGURES 5 and 5A have been adopted to represent respectively the "clear" or "zero" and the "set" or "one" condition in turn representative of intelligence. As explained in the publication above mentioned, the flux disposition of FIGURE 5B responsive to priming a "set" core is necessary to obtain a magnetic path sufficiently linking the output coupling for intelligence transfer. This condition is accomplished by application of prime current in the sense indicated in FIGURE 3. The transposition of a core magnetization state from that of FIGURE 5A to that of FIGURE 5B results in a flux change acting on the coupling loop 72 in a manner to produce a current therein opposite in direction to the prime current. Thus, "priming" of "set" core 60 will induce a current $i_{cx}$ in coupling loop 72 and "priming" of "set" core 62 will induce a current $i_{cy}$ in loop 72. It will be apparent that the reverse winding of loop 72 with respect to cores 60 and 62 will result in $i_{cx}$ aiding $I_p$ in core 62 and $i_{cy}$ aiding $I_p$ in core 60. The resultant M.M.F. acting on each core will be the M.M.F. caused by $I_p$ and $i_c$. Referring now to FIGURE 4, it will be apparent that values of applied $I_p$ approaching maximum range will be extended by $i_c$ to an effective $I_p$ into the L1 and G1 area of improper circuit operation. Thus it is that the applied $I_p$ must be limited to a value so that the M.M.F. produced by $I_p$ and $i_c$ is less than the maximum limit of prime M.M.F. The range is thereby reduced as indicated in FIGURE 4. With typical known magnetic devices, this limitation reduces the allowable $I_p$ from 240 ma. to 160 ma. or thirty-three percent. This reduction is prohibitive in commercially acceptable core devices.

In FIGURE 2, the circuit of FIGURE 3 is shown with the addition of an "advance" winding 68 and an auxiliary or dummy loop 78 and with the "load" represented by R and L. It will be noted that the loop 78 is wound about the cores 60 and 62 adjacent the loop 72 but in the same relative sense, i.e., down through the output legs of the cores. Any M.M.F. acting on the loop 72 will therefore act on loop 78 to the same extent and if the R and L of each loop be assumed as identical, then equal currents will be induced in each loop. Since the loop 78 threads each core in the same sense, the prime induced current $i_D$ will flow in the same direction in both cases of "priming" "set" cores 60 or 62. In the case of core 60, the current $i_{cx}$ tending to reenforce $I_p$ in core 62 will be opposed by $i_D$ passing down through the output aperture of core 62. Similarly, "priming" of a "set" core 62 including an $i_{cy}$ reenforcing $I_p$ in core 60 will result in an $i_D$ opposing $i_{cy}$. The M.M.F.'s resulting from $i_c$ will thus be cancelled by the M.M.F. from $i_D$ in each instance of priming a "set" core. The actual $I_p$ may then be extended to the normal maximum range as indicated in FIGURE 4 and the core device will be compatible with other core devices of acceptable range.

The advance or transfer cycle wherein a clearing M.M.F. is applied by $I_A$ to the winding ADV. "O" serves to drive the cores 60 and 62 from the "primed one" state shown in FIGURE 5B to the "cleared" state shown in FIGURE 5 to effectively return the cores to their "zero" state and produce a "one" output in the coupling loop 72 from each of the cores through currents in opposing relationship due to the sense of the windings coupling the cores.

Considering that the coupling loop 72 in fact threads the input aperture of another core capable of receiving intelligence transfer, it will be recognized that the impedance of loop 72, as viewed from either transmitting leg, will be other than purely resistive and will include a reactive component L caused by the wire inductance and core material. To achieve the cancellation heretofore described, the dummy loop should include the same resistance and inductance as the coupling loop. Theoretically the provision of $R_D=R_c$ and $L_D=L_c$ will suffice to accomplish the desired cancellation during priming. Practically, since priming occurs relatively slowly, the inductive component is of secondary importance. The main criterion is that the resistance of the dummy loop be equal to that of the coupling loop so that $i_D$ will produce an M.M.F. cancelling the M.M.F. generated by $i_c$ during priming.

The advance cycle produces a rapidly developed advance current $I_A$ in turn generating a fast reversal of core magnetization (assuming a set core). The change in flux coupling the loops 72 and 78, during the advance cycle, will therefore generate a rapidly developed current. If the dummy loop included no inductance $L_D$ to correspond to the inductance $L_c$ it will be apparent that the dummy loop current would be high while the coupling loop current would be much less than that necessary for an efficient transfer of intelligence. To avoid excessive loading of the transmitting aperture $L_D$ must be added to the dummy loop. Ideally, $L_D$ should have characteristics to cause the dummy load to act as a short circuit during priming so that only the coupling and dummy loop resistances are effective in matching induced prime currents and to act as a high impedance during the advance cycle so that the transmitting apertures have as little extra load as possible.

A suitable $L_D$ may be provided by the addition of a toroid threaded by the dummy loop, or alternatively by an air inductance inserted in the dummy loop. The toroid should be selected to have a threshold just high enough to prevent switching by the induced prime current $i_D$. The air inductance should have a value small enough to be of little effect on the dummy loop current during priming and large enough to provide a high impedance during the much faster advance cycle. In other words, the values of $L_c$ in either case should be selected to have little or no effect during priming but substantial effect during advance.

It should be kept in mind, however, that the result to be achieved is a cancellation of M.M.F. and that the impedance of the dummy load may be made larger or smaller than the impedance of the coupling loop by increasing or decreasing the number of turns $N_D$ of the dummy winding with respect to the turns $N_C$ of the coupling winding so that $i_cN_c$ is approximately equal to $i_DN_D$. In this manner, the dummy load impedance may be made larger or smaller than the coupling loop impedance with a proportional decrease or increase of $i_D$ and a compensating change in the number of turns $N_D$ to effect an $i_DN_D$ equal to the M.M.F. of the coupling loop current. One other consideration involves the fact that during intelligence transfer, the M.M.F. generated by $I_A$ must be sufficient to transfer a coupling loop current large enough to "set" the succeeding core with at least unity gain notwithstanding dummy loop loss. This may be accomplished by adjusting the ampere-turns of "advance" M.M.F.; either $I_A$, the number of turns or both. Reference may be had to the article by Dr. Bennion for a description of the selection of the proper turns ratio.

As a matter of practice, $N_D$ may be made equal to $N_C$ and the impedance of the dummy loop may be sufficiently matched to that of the coupling loop by including a dummy winding and a small core or an air inductance which combine with the dummy loop resistance to produce an impedance approximately equal to the impedance of the coupling loop with respect to the same point in each loop.

Referring now to FIGURE 1, there is shown a logic module exemplifying the present invention. The function of the circuit of FIGURE 1 is that of an exclusive OR requiring an output of $Z=1$ responsive to inputs of $X=1$, $Y=0$, or $X=0$, $Y=1$; and an output of $Z=0$ responsive to inputs of $X=1$, $Y=1$ or $X=0$, $Y=0$. The cancellation of an output responsive to equal inputs demands the reverse common coupling winding heretofore described. Numerous other logic circuits utilize similar cancellation and the invention can be similarly utilized to provide an extended prime range in the manner described relative to the circuit of FIGURE 1.

The cores 10 and 12 represent, respectively, the two inputs X and Y coupled to input windings 32 and 34. Application of an input current having an M.M.F. large enough to reverse the inner leg magnetic path in the manner of FIGURE 5A effectively "sets" a "one" into the cores. Application of either no input current or a current having an M.M.F. less than that needed to overcome the inner leg magnetization threshold results in the cores remaining in the state of FIGURE 5; i.e. "cleared" or "zero." The output core 14 includes two input apertures 26 and 28 intersected by the coupling windings 36 in a sense so that coupling loop current of a sufficient M.M.F. flowing up through the aperture will "set" the core 14. Current flowing down through the aperture will merely drive the core magnetization clockwise or further into the negative elastic region of the core hysteresis curve with no substantial effect on the intelligence state of the core. Thus, current "setting" one of the apertures 26 or 28 will not practically effect the other aperture.

Core 14 may be "primed" as heretofore described and "cleared" by the ADV. "E" current on winding 42 to produce an output Z on winding 40.

A description of circuit operation will be limited to the situations of $X=1$, $Y=0$ and $X=1$, $Y=1$, the remaining required functions being similar. Assuming both cores 10 and 12 to be "cleared," an input on winding 32 of a current representing a "one" will "set" core 10 in a manner described, core 12 remaining cleared. The application of $I_p$ on winding 44 will "prime" core 10 but will not effect core 12 since the core threshold at aperture 24 is significantly above that switchable by the M.M.F. generated by $I_p$ when core 12 is in its "cleared" state. "Priming" of the core 10 will generate a current $i_{cx}$ in the direction indicated and a current $i_D$ in same direction because both windings 36 and 38 thread the aperture 22 in the same sense. The currents $i_{cx}$ and $i_D$ will generate an opposing and cancelling M.M.F. in the core 12 because the windings 36 and 38 thread aperture 24 in a reverse sense.

By providing the winding 38 with an impedance including a resistance and inductance substantially the same as that of the coupling loop 36 the M.M.F. effects of $i_D$ and $i_c$ are made approximately equal to cancel any tendency of $i_c$ in reenforcing $I_p$ in core 12.

Assuming that the ADV. "O" pulse is next applied, the core 10 will be cleared transferring a "one" to core 14 and the dummy load core 16 will be driven in the "set" direction. The application of ADV. "E" will then "clear" core 14 producing an output of $Z=1$ on winding 40. The application of ADV. "E" will also "clear" the toroid 16 returning it to the proper state for the next cycle.

Alternatively, assuming that both cores 10 and 12 are in the "clear" state and that inputs $X=1$, $Y=1$ are then applied to windings 32 and 34, the application of $I_p$ will "prime" both cores and tend to generate equal and opposite currents $i_{cx}$ and $i_{cy}$ which will cancel. The dummy loop current will have no substantial effect since it would oppose $I_p$ in both cores. The application of ADV. "O" will tend to generate transfer currents in the coupling loop 36 will cancel to effectively transfer a "zero" to core 14; current in loop 38 again driving dummy core 16 in the "set" direction. The application of ADV. "E" will therefore produce no output on winding 40 and Z will equal "zero" as required by the exclusive OR function.

To avoid any possibility of cores 10 and 12 being affected (set or partially set) by the dummy loop current generated by the flux change in core 16 during ADV. "E," the winding 42 may be linked back through apertures 22 and 24 in a sense opposite to the dummy loop 38, i.e., down through each aperture. In this manner, ADV. "E" current will "hold" the cores 10 and 12 by cancelling the effect of dummy loop current due to core 16 being cleared.

The toroid 16 may be replaced by a simple air inductance with the same general effect. The inductance will serve as a reactance which, when added to the resistance of the loop 38, will present an impedance similar to that of the coupling loop. The use of an air inductance in the loop 38 eliminates the need for the use of ADV. "E" to clear the toroid.

In an actual unit connected to have its X and Y inputs driven by a 15-bit linear feed-back shift register applying input pulses approximately 0.8–1.3 microseconds in length and 1.4 amperes or greater in amplitude, the components employed were as follows: The cores as indicated as X and Y and Z were comprised of cores supplied by the General Ceramics Corporation of Keasbey, New Jersey, identified as number F–1075–5209; two such cores being used for X and for Y and one core for Z. The coupling loop between the cores was comprised of 1.5 inches of No. 33 A.W.G. triple coated Formvar copper conductor having two turns through the apertures of the X and Y cores and one turn through the two input apertures of the Z core. The dummy loop was comprised of an identical link of the same wire employed in the coupling loop. The dummy loop intersected two 50/80 mil ferrite toroids of a material similar to that of the X, Y and Z cores.

The foregoing circuit could be modified to include an air inductance in place of the toroids by inserting a coil of approximately 10μh. inductance and reducing the 1.5-inch link of the dummy loop so that the total resistance of the loop and the coil equals the resistance of the coupling loop or that of 1.5 inches of No. 33 A.W.G. conductor.

The invention as thus far described has shown a dummy load which does not serve the function of intelligence transfer. In certain circuits, the input cores (X and Y) will include common coupling loops extending to separately link two further cores capable of receiving an intelligence transfer from one or both of the input cores. Following the teaching of the present invention the senses of coupling windings may be made so that for certain logic functions the "priming" of one "set" core will not provide an M.M.F. adding to the prime M.M.F. at the other transmitter core. For example, in the circuit of FIGURE 1, if the toroid 16 were replaced with a core similar to core 14 and threaded by the dummy loop 38 in a sense to be "set" by the application of ADV. "O" to either or both "primed" cores 10 or 12 then the added core would serve as a logical OR to transfer intelligence and operate as the dummy load.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

1. A magnetic device for handling intelligence in binary form comprising multi-aperture magnetic cores capable of being driven into stable states of magnetization representative of binary intelligence by applied magnetomotive force; means adapted to drive two of said cores with binary input signals and means linking said two cores adapted to cause the intelligence states thereof to be transferred therefrom, said means including a priming winding linking a transmitting aperture of each core and adapted to apply a priming magnetomotive force thereto prior to each intelligence transfer from the said core, the transmitting apertures of the said two cores including output legs wound by a common coupling winding linking the said output legs in a reverse sense and linking the input leg of a further core, an auxiliary load including a winding linking the said output legs of the two cores in the same relative sense and having an impedance so related to the impedance of said coupling winding as to assure an approximate equality of ampere turns at each of said windings with respect to prime induced currents such that said auxiliary load operates to cancel the effect of prime induced magnetomotive forces in said coupling loop.

2. The device of claim 1 wherein said auxiliary load impedance includes a core of magnetic material threaded by said auxiliary winding.

3. The device of claim 1 wherein said auxiliary load impedance includes an air inductance.

4. A magnetic device comprising multi-aperture cores capable of being driven into stable states of magnetization by applied magnetomotive force, two of said cores having minor transmitting apertures threaded by a means adapted to apply priming magnetomotive force prior to intelligence transfer, said cores being further adapted to be driven by an advance winding means to effect intelligence transfer, the transmitting apertures of two said cores having output portions linked by a common coupling winding in a reverse sense relative to each said core, the coupling winding further linking an input portion of a third core, an auxiliary winding linking said output portions of the two cores in the same relative sense and having an impedance related to the impedance of said coupling winding such that magnetomotive forces generated proximate each said winding by prime induced current in the windings are approximately equal to effect a cancellation of prime induced magnetomotive forces in said coupling winding and the effects thereof on said cores with respect to intelligence content or transfer 5. A magnetic device comprising multi-aperture cores capable of being driven into stable states of magnetization by applied magnetomotive force, at least two input cores and an output core, priming means linking at least said two cores and adapted to apply a priming magnetomotive force to the transmitting output minor apertures, advance means linking at least said two cores and adapted to apply an advance magnetomotive force to effect intelligence transfer therefrom, a coupling loop linking output legs of the transmitting apertures of said input cores in a reverse sense and linking the input legs of two input apertures of said output core, a dummy load including a winding linking said output legs in the same sense, the said dummy load having a resistance approximately equal to the resistance of said coupling loop and having an inductance approximately equal to the inductance of said coupling loop whereby said dummy load effectively cancels prime induced magnetomotive forces in said coupling loop and operates as a high impedance during the application of advance magnetomotive forces.

6. A magnetic core device including input and output multi-aperture magnetic cores and means for effecting a transfer of intelligence therebetween comprising a first winding adapted to apply a rapidly developed magnetomotive force following a previous application by means adapted to apply a relatively slowly developed magnetomotive force as a transfer cycle for intelligence transfer, a coupling loop threading the input magnetic cores about an output leg of a transmitting minor aperture thereof also threaded by said means applying said slowly developed magnetomotive force, said coupling loop linking the output magnetic core to transfer intelligence thereto during said transfer cycle, a further winding linking said output legs of transmitting apertures of said two cores and including means adapted to develop an opposing magnetomotive force to preclude induced currents flowing in said coupling loop during the application of said slowly developed magnetomotive force and means adapted to reduce the effective load on said input cores by said further loop by an inductive component thereof with respect to said rapidly developed magnetomotive force.

References Cited by the Examiner

UNITED STATES PATENTS

| | | | |
|---|---|---|---|
| 2,953,774 | 9/1960 | Slutz | 307—88 |
| 3,114,138 | 12/1963 | Mallinson | 340—174 |
| 3,159,813 | 12/1964 | Dowling | 340—174 |

FOREIGN PATENTS 1,078,614 3/1960 Germany.

BERNARD KONICK, *Primary Examiner.*

IRVING SRAGOW, *Examiner.*

M. K. KIRK, G. LIEBERSTEIN, *Assistant Examiners.*